(12) United States Patent
Hesselmans et al.

(10) Patent No.: US 6,599,977 B1
(45) Date of Patent: Jul. 29, 2003

(54) PROCESS FOR THE PREPARATION OF AN AQUEOUS DISPERSION OF AN ANIONIC POLYURETHANE FREE OF VOLATILE TERTIARY AMINES

(75) Inventors: Laurentius Cornelius Josephus Hesselmans, 's-Hertogenbosch (NL); Josep Oller Chirivella, Sant Quirze des Valles (ES)

(73) Assignee: Stahl International B.V., Waalwijk (NL)

( * ) Notice: Subject to any disclaimer, the term of this patent is extended or adjusted under 35 U.S.C. 154(b) by 0 days.

(21) Appl. No.: 09/857,004

(22) PCT Filed: Oct. 16, 2000

(86) PCT No.: PCT/NL00/00741

§ 371 (c)(1),
(2), (4) Date: Aug. 28, 2001

(87) PCT Pub. No.: WO01/27179

PCT Pub. Date: Apr. 19, 2001

(30) Foreign Application Priority Data

Oct. 15, 1999 (NL) .............................................. 1013301

(51) Int. Cl.$^7$ .................... C09D 175/04; C09D 175/12; C08J 3/03; C08L 75/04; C08L 75/12

(52) U.S. Cl. ...................... 524/840; 524/591; 524/839; 524/500; 524/501; 525/453; 525/457; 528/71; 428/297.4; 428/311.11; 428/311.71; 428/319.3; 428/423.1; 428/423.4; 428/425.1; 428/425.6; 428/425.8

(58) Field of Search ................................. 524/591, 839, 524/840, 500, 501; 525/453, 457; 528/71; 428/297.4, 311.11, 311.71, 319.3, 423.1, 423.4, 425.1, 425.6, 425.8

(56) References Cited

U.S. PATENT DOCUMENTS 4,701,480 A * 10/1987 Markusch et al. .......... 523/340
5,679,754 A * 10/1997 Larson et al. .................. 528/28

FOREIGN PATENT DOCUMENTS

EP 0219677 A 4/1987
EP 0717057 A 6/1996

* cited by examiner

*Primary Examiner*—Rabon Sergent
(74) *Attorney, Agent, or Firm*—Jeffrey D. Myers

(57) ABSTRACT

The present invention relates to a process for the preparation of an aqueous dispersion of an anionic polyurethane. According to the invention, a tertiary amine functional urethane polymer or oligomer acts as acid neutralizing agent. The process of the invention comprises the steps of: dispersion of an anionic isocyanate functional polyurethane prepolymer in water in the presence of a tertiary amine functional urethane polymer or oligomer and chain extension of the anionic polyurethane prepolymer with a reactive hydrogen functional material during or after the dispersion in water.

18 Claims, No Drawings

PROCESS FOR THE PREPARATION OF AN AQUEOUS DISPERSION OF AN ANIONIC POLYURETHANE FREE OF VOLATILE TERTIARY AMINES

The present invention relates to a process for the preparation of aqueous dispersions of anionic polyurethanes, to the obtained dispersions and to a coated substrate or film obtained with said dispersion.

INTRODUCTION

Aqueous dispersions of polyurethanes are well known as basis for the preparation of coating compositions. They may be used for protective or decorative coating, optionally in combination with additives like coloring agents, pigments, matting agents, and the like. Polyurethanes can posses many desirable properties such as good chemical resistance, water resistance, solvent resistance, toughness, abrasion resistance, durality.

Dispersibility of the polyurethanes in water can be achieved by incorporation of appropriate chain pendant ionic groups, chain pendant non-ionic hydrophilic groups, or in-chain non-ionic hydrophilic groups in the structure of the polyurethane polymer. If suitable, external surfactants can be applied in addition. Preferably anionic groups are incorporated into the polyurethane backbone, such as carboxylic, sulfonic, sulfate or phosphate groups. They are introduced by reaction of a reactive hydrogen functional compound having at least one acid group with a polyisocyanate. Most common is the incorporation of a carboxylic acid functional compound.

The carboxylic acid functions are generally neutralized before or during dispersion of the polyurethane prepolymer into water with a volatile tertiary amine. Anorganic bases are less convenient, since the polyurethane will generally coagulate when they are applied or it will provide highly water sensitive films or coatings. To prevent coagulation it is suitable to incorporate a great number of hydrophilic polyethoxy chains into the polymer system, but the coatings prepared from these dispersions will be very sensitive to water as well.

A disadvantage of the use of volatile tertiary amines as neutralizing agent is that they evaporate during the film formation, and therefore will cause unacceptable environmental pollution.

The present invention offers a process to prepare aqueous dispersions of anionic polyurethanes containing no volatile tertiairy amines.

DESCRIPTION OF THE INVENTION

According to the present invention there is provided a process for the preparation of an aqueous dispersion of an anionic polyurethane in which a tertiary amine functional urethane polymer or oligomer acts as acid neutralising agent. The process according to the present invention comprises the steps of: dispersion of an anionic isocyanate functional polyurethane prepolymer into water in the presence of a tertiary amine functional urethane polymer or oligomer and chain extending the polyurethane prepolymer with a reactive hydrogen functional material during or after the dispersion in water.

The anionic group in the polyurethane to be neutralized may be a carboxylic acid group.

The tertiary amine functional urethane polymer or oligomer of the invention is prepared by the reaction of a polyisocyanate or an isocyanate functional polyurethane prepolymer with a reactive hydrogen functional material which contains tertiary amine functions.

The urethane polymer or oligomer which contains tertiary amine functions can be prepared as a pure oligomeric or polymeric material, it can be prepared in a solvent system, or it can be prepared as an aqueous dispersion. The tertiary amine functional urethane polymer or oligomer of the invention may be prepared by the steps of:

preparation of an isocyanate functional polyurethane prepolymer containing tertiary amine functions from a polyisocyanate, and a polyol which contains tertiary amine functions, chain extending and/or partially capping of the prepolymer with a reactive hydrogen functional material.

As mentioned above the tertiary amine functional urethane polymer or oligomer may occur in an aqueous dispersion which is prepared by the steps of:

preparation of an isocyanate functional polyurethane prepolymer containing tertiary amine functions from a polyisocyanate, and a polyol which contains tertiary amine functions dispersion of the prepolymer into water, chain extending and/or partially capping of the prepolymer with a reactive hydrogen functional material during or after the dispersion into water.

The polyol which contains tertiary amine functions and which is used for the preparation of the polyurethane prepolymer is N-ethyldiethanolamine, N-butyldiethanolamine, N-tert-butyldiethanolamine, 3-diisopropyl-amino-1,2-propanediol, 3-(dimethylamino)-1,2-propanediol, 3-(diethylamino)-1,2-propanediol, triethanol-amine, tripropanolamine, triisopropanolamine and is preferably N-methyldiethanolamine or (3-dimethylamino-propyl) diisopropanolamine.

The reactive hydrogen functional material which is used in the preparation of the tertiary amine functional urethane polymer or oligomer or dispersion thereof is a tertiary amine functional polyol, polyamine, monoamine, monoalcohol or a mixture thereof. When the reactive hydrogen functional material is a polyol or a poly-amine it may be a polyol containing a tertiary amine function as described above or is a diamine which is bis(3-aminopropyl)methylamine.

To obtain a maximal tertiary amine concentration the reactive hydrogen functional material for the capping of the prepolymer is preferably a mono-amine or mono-alcohol containing a tertiary amine function, which may be, 2-(diethylamino)ethylamine, 3-(diethylamino)propyl-amine, N,N,N'-trimethylethylene-diamine, N,N,N'-trimethyl-1,3-propane-diamine, N,N,2,2-tetra-methyl-1,3-propane-diamine, N,N-diethylethanolamine, 1-dimethylamino-2-propanol, 3-dimethyl-amino-1-propanol, 2-dimethyl-amino-2-methyl-1-propanol, 1-diethylamino-2-propanol, 3-diethyl-amino-1-propanol, 2-(diisopropylamino)ethanol, 5-diethylamino-2-pentanol, 2-(dibutyl-amino)ethanol and is preferably 2-(dimethylamino)-ethylamine, 3-(dimethyl-amino) propylamine or N,N-dimethyl-ethanolamine or bis(3-dimethylaminopropyl)amine, or mixtures thereof.

The polyisocyanate which is used for the preparation of the tertiary amine functional prepolymer is 2,4-toluene-diisocyanate, 2,6-toluenediisocyanate and mixtures thereof, 1,6-hexanediisocyanate, dicyclohexylmethane-4,4'-diisocyanate, 3-isocyanatomethyl-3,5,5-trimethylcyclo-hexylisocyanate, or tetramethylxylene-diisocyanate, N',N", N'''-tris(6-isocyanato-hexyl)isocyanurate, or N,N'bis(6- isocya-natohexyl)-N-(6-isocyanatohexylamido)urea, or mixtures thereof.

In order to obtain a fine particle sized dispersion it is suitable to incorporate hydrophilic groups into the tertiary amine functional prepolymer. For this reason other polyols may be present during the prepolymer formation which may be a polyethoxy diol, a poly(ethoxy/-propoxy) diol, a diol containing a pendant ethoxy or (ethoxy/propoxy) chain, a diol containing a carboxylic acid or a sulphonic acid or salt, or mixtures thereof.

The obtained prepolymer may be chain extended or partially capped and partially chain extended. The reactive hydrogen functional reactive material for the chain extending is a diamine which may be; 1,2-diamino-propane, 1,3-diaminopropane, hydrazine, 5-amino-1,3,3-trimethyl-cyclohexanemethyl-amine, methylpentanediamine, hexanediamine, butyldiamine, poly(ethoxy/propoxy) diamine, polyethoxydiamine, polypropoxydiamine, bis(3-amino-propylamine) or a N-hydrazone functional 5-amino-1,3,3-trimethylcyclohexane methylamine, or mixtures thereof.

The anionic polyurethane prepolymer used in the process is prepared by conventional methods. EP 308115 presents an overview of suitable polyols and polyisocyanates as well as of reactive hydrogen functional compounds to chain extend the prepolymer. Essentially the anionic polyurethane of the process contains carboxylic acid groups which are neutralized by the tertiary amine functional urethane polymer or oligomer. The ratio of tertiary amine functions in the neutralizing agent to the carboxylic acid functions in the anionic polyurethane is from 0.5 to 1.5 and prefarably from 0.7 to 1.2.

Both the anionic polyurethane and the tertiary amine functional urethane polymer or oligomer or dispersion thereof may contain additional functional groups with the objective to improve the waterdispersibility, to improve adhesion to substrates at application, for performance reasons, or as potential sites for crosslinking. Suitable functions are polyalkoxy functions with a large concentration of ethoxy functions, are tertiairy amine or quaternairy amine functions, perfluor functions, incorporated silicon functions, hydrazide functions or hydrazone functions, ketone, acetoacetate, or aldehyde functions, or mixtures thereof.

The aqueous polymer dispersions produced by the method of the invention are stable for long periods of time. If desired minor amounts of solvents may be included in the dispersions.

Many additional ingredients may also be present in the application stage, for example fillers, colorants, pigments, silicons, flow agents, foaming agents, matting agents, and the like.

The aqueous polymer dispersions produced by the method of the invention may be used in adhesives, sealants, printing ink and in coatings.

The invention further comprises the dispersions obtained by the process and the coated substrates or films obtained by applying the dispersions onto a substrate such as leather or artificial leather, metals, wood, glass, plastics, paper, paper board, textile, non-woven, cloth, foam and the like by conventional methods, including spraying, flow-coating, transfer-coating, roller coating, brushing, dipping, spreading and the like.

Various aspects features and embodiments of the present invention are illustrated by the following examples. These examples are only illustrative and do not intend to limit the invention as claimed hereafter.

EXAMPLES

Example 1

Preparation of a tertiary amine functional polyurethane dispersion.

A mixture of 69.07 g (58,5 mmole) of a 2-(hydroxymethyl)-2-[(oxyethylated)hydroxymethyl)-butane-1-ol having a molecular weight of 1180 and obtainable from Th. Goldschmidt as Tegomer D-3403 (hereafter referred to as Tegomer D-3403) and 59.85 g (503 mole) of methyldiethanol-amine in 135 g of Proglyde DMM (non-protic solvent obtainable from The Dow Chemical Company) was heated to 60° C. while stirring. 186.08 g (837 mmole) of 3-isocyanato-methyl-3,5,5-trimethylcyclohexylisocyanate (hereafter refered to as IPDI) was added and the mixture was heated to 95° C. The mixture was stirred for 2 hrs at 95° C. and cooled down. The NCO-content was 4.52%. The NCO-amount was determined by adding a solution of dibutylamine to a sample of the product which reacts with isocyanate functions which are present in the sample. The remaining DBA is titrated with 1 MHCl. In the calculation a correction has been made for the tertiary amines.

100 g of the isocyanate functional product was mixed with 1 g of sodium dioctylsulphosuccinate and the mixture was slowly added to a mixture of 5.27 g of 3-(dimethylamino)-propylamine and 1,35 g of hydrazinehydrate in 145,16 g of water. The mixture was stirred for 30 min. The reaction was checked by the disappearance of the NCO-signal in the Infrared spectrum. The product was characterized by a solids amount of 30%, a pH of 9.58, a viscosity of 1100 cps. The amount of tertiary amine in the product was 0.64 meq/g.

Example 2

Preparation of a tertiary amine functional polyurethane dispersion.

Example 1 was repeated with the exception that the 3-(dimethylamino)propylamine was replaced by 10.06 g of of bis(3-dimethylaminopropyl)amine and 158.34 g of water was used. The product was characterized by a solids amount of 30%, a pH of 9.40, a viscosity of 800 cps. The amount of tertiary amine in the product was 0.81 meq/g.

Example 3

Preparation of a hydrazon functional chain extender.

100 g (1 mole) of ethylacrylate was added within 45 min to 170 g (1 mole) of isophoron diamine at 40–45° C. The mixture was stirred for 4 hrs at 40–45° C. The reaction was checked by the disappearance of the double bond signals at 960 and 1600 $cm^{-1}$ in the infrared spectrum. The intermediate product was a ethyl N-aminopropionate functional isophorone diamine. 50 g of hydrazine hydrate (1 mole) was added to the product at 55° C. and the reaction mixture was heated and stirred at 55–60° C. during 5 hrs. The reaction was checked by the disappearance of the carbonyl signal at 1740 $cm^{-1}$ from the ester carbonyl and the appearance of the carbonyl signal from the hydrazide carbonyl at 1650 $cm^{-1}$ in the infrared spectrum. The second intermediate product was a N-hydrazido-propionate functional isophorone diamine. 58 g (1 mole) of acetone was added to the obtained product at ambient temperature and the mixture was stirred for 15 min. The product was an isophorone diamine substituted at one N by an 3-propionyl hydrazone. The product contained 2.65 meq/g of hydrazone functions and 5.29 meq/g of amine functions.

Example 4

Preparation of a tertiary amine and hydrazone functional polyurethane dispersion.

Example 1 was repeated with the exception that the hydrazine was replaced by 10.17 g of the product of example 3 and 158.41 g of water was used. The product was characterized by a solids amount of 30%, a pH of 9.40, a viscosity of 400 cps. The amount of tertiary amine in the product was 0.60 meq/g and the amount of hydrazone was 0.098 meq/g.

Example 5

Preparation of a tertiary amine and hydrazone functional polyurethane dispersion Example 1 was repeated with the exception that the hydrazine and the 3-(dimethylamino)propylamine were replaced by 19.32 g of the product of example 3 and 157.61 g of water was used. The product was characterized by a solids amount of 30%, a pH of 9.40, a viscosity of 600 cps. The amount of tertiary amine in the product was 0.40 meq/g and the amount of hydrazone was 0.185 meq/g.

Example 6

Preparation of a tertiary amine functional urethane oligomer.

A mixture of 25.49 g (21.6 mmole) of Tegomer D-3403 and 28.20 g (316.8 mmole) of dimethylethanolamine in 53.02 g of Proglyde DMM was heated to 60° C. while stirring. 70.03 g (120 mmole) of N,N',N''-tris(6-isocyanato-hexyl)isocyanurate was added and the mixture was heated to 95° C. The mixture was stirred for 2 hrs at 95° C. The absence of residual isocyanate was checked by IR-spectroscopy and the mixture was cooled down.

The product was characterized by a solids amount of 70%, a viscosity of 14000 cps. The amount of tertiary amine functions per gr was 1.79 meq/g.

Example 7

Preparation of anionic polyurethane dispersions in which a tertiary amine functional polyurethane acts as neutralizing agent for carboxylic acid functions.

First an isocyanate functional polyurethane prepolymer was prepared: 128.55 g (137.49 mmole) of Ruco S1015-120 (a polyester obtainable from Occidental with a molecular weight of about 935 g), 374.07 g (124.69 mmole) of Ruco S1015-35 (a polyester obtainable from Occidental with a molecular weight of about 3000 g) and 37.8 g (266.49 mmole) of 2,2-dimethylol propanoic acid in 84 g of dipropylene glycole dimethyl ether were heated to 80° C. 211.47 g (951.59 mmole) of IPDI was added and the mixture was heated to 100° C. while stirring. The mixture was reacted at 100° C. for 2 hours. After 1 hour 0.1 g of tinoctoate was added as a catalyst. The reaction mixture was cooled down and the NCO-amount of the obtained prepolymer appeared to be 3.95%. The amount of carboxylic acid functions is 0.336 meq/g.

A product of example 1, 2, 4 or 5 in an amount which is presented in table I together with 4 g of sodium dioctylsulphosuccinate was mixed in 100 g of the prepolymer by high shear mixing, immediately followed by an amount of water as presented in the table. When the mixture was homogeneous the dispersed polyurethane prepolymer was chain extended by the addition of 2.23 g of hydrazine hydrate and stirring for 30 minutes. The aqueous polyurethanes obtained are characterized by a solids amount of 30%, a pH between 6.8 and 7 when a stoichiometric amount of the tertiary amine functional urethane polymer was used, a pH of 6.6 when the ratio tertiary amine functions: carboxylic acid functions was 0.7 and a pH of 7.9 when the ratio of tertiary amine functions: carboxylic acid functions was 1.2. Films of 200µ were prepared. They all were clear flexible films.

TABLE 1 amount of tertiary amine functional urethane polymer or oligomer used as carboxylic acid neutralizing agent in Example 7

| Acid neutralizing agent of example | ratio of tertiary amine functions regarding to the carboxylic acid functions in the anionic polyurethane prepolymer | weight amount of the neutralizing agent per 100 g of the anionic polyurethane prepolymer (g) | amount of water used for the dispersion (g) |
|---|---|---|---|
| 1 | 0.7 | 36.75 | 251.53 |
| 1 | 1.0 | 52.50 | 272.53 |
| 1 | 1.2 | 63.00 | 286.53 |
| 2 | 1.0 | 41.48 | 257.84 |
| 4 | 1.0 | 56.00 | 277.20 |
| 5 | 1.0 | 84.00 | 314.53 |

Example 8

Preparation of hydrazone functional anionic polyurethane dispersions in which the action of a tertiary amine functional polyurethane as neutralizing agent for carboxylic acid functions is compared with triethyl amine or sodium hydroxide as neutralizing agent.

88.24 g (86.68 mmole) of a polypropylene glycol with a molecular weight of 1018, 132.36 g (66.18 mmole) of a polypropylene glycol with a molecular weight of 2000 and 15.96 (112.52 mmole) of 2,2-dimethylpropanoic acid in 21 g of dipropylene glycole dimethylether were heated to 80° C. 142.443 g (640.99 mmole) of IPDI was added and the mixture was heated to 100° C. while stirring. The mixture was reacted for 2 hours at 100° C. After 1 hour 0.1 g of tinoctoate was added as a catalyst. The reaction mixture was cooled down and the NCO-amount of the obtained prepolymer appeared to be 5.18%.

A stoichiometric amount of product of example 4 or of sodium hydroxide or of triethylamine regarding to the carboxylic acid function in the prepolymer was added to 100 g of the prepolymer by high shear mixing in a weight amount which is presented in table 2 together with 2 g of sodium dioctyl sulphosuccinate, immediately followed by an amount of water as presented in table 2. When the mixture was homogeneous the dispersed polyurethane prepolymer was chain extended by the addition of 1.53 g of hydrazine followed by 12.83 g of the product of example 4 in 20 g of water and stirring for 30 minutes. The aqueous polyurethanes obtained are characterized by a solids amount of 30% and depending on the neutralizing agent used a pH as showed in the table.

TABLE 2

Comparing conventional carboxylic acid neutralizing agents and an carboxylic acid neutralizing agent according to the invention

| neutralisation for carboxylic acid functions | weight amount of the acid neutralizing agent per 100 g of the anionic polyurethane prepolymer (g) | amount of water used for the dispersion (g) | pH of the dispersion |
|---|---|---|---|
| triethylamine | 2.86 | 214.89 | 8.1 |
| 20% NaOH in water | 5.67 | 215.86 | 8.3 |

TABLE 2-continued

Comparing conventional carboxylic acid
neutralizing agents and an carboxylic acid
neutralizing agent according to the invention

| neutralisation for carboxylic acid functions | weight amount of the acid neutralizing agent per 100 g of the anionic polyurethane prepolymer (g) | amount of water used for the dispersion (g) | pH of the dispersion |
|---|---|---|---|
| product of example 4 | 47.26 | 217.75 | 7.3 |

Films of 230 μm were prepared of the pure products or with a stoichiometric amount of an NCO-crosslinker regarding to the incorporated hydrazone functions. The NCO crosslinker was XR-5350 (obtainable from Stahl Holland). The weight increase of the films in water was measured after treatment of the films with water for 24 hours. The results are presented in table 3. The results show that the sensitivity towards water is comparable for the films prepared from the polyurethane dispersion in which the carboxylic acid functions were neutralized with the product of example 4 and with triethyl amine, while the films of the polyurethanes with NaOH as neutralizing agent are more sensitive to water. The films containing a hydrazone function which are crosslinked by the NCO-crosslinker have a lower weight increase in water. Since the tertiary amine functional product of example 4 contains hydrazone functions as well, they will be coupled to the anionic polyurethane polymer chain during the film formation.

TABLE 3

Comparing water uptake of films of anionic
polyurethane dispersions from which the
carboxylic acid functions which were neutralised
with several neutralisation agents

| neutralisation for carboxylic acid functions | crosslinking with XR-5350 | weight increase of the films in water |
|---|---|---|
| triethylamine | − | 34.2 |
| 20% NaOH in water | − | 50.5 |
| product of example 4 | − | 33.8 |
| triethylamine | + | 18.3 |
| 20% NaOH in water | + | 28.0 |
| product of example 4 | + | 17.5 |

What is claimed is:

1. A process for the preparation of an aqueous dispersion of an anionic polyurethane wherein a tertiary amine functional urethane oligomer or polymer is employed as an acid neutralizing agent for the anionic group of the anionic polyurethane, which process comprises the steps of:
    preparing a tertiary amine functional urethane oligomer or polymer;
    preparing an anionic isocyanate functional polyurethane prepolymer;
    dispersing the anionic isocyanate functional polyurethane prepolymer into water in the presence of said tertiary amine functional urethane oligomer or polymer; and
    chain extending the anionic polyurethane prepolymer with a reactive hydrogen functional material during or after the dispersing step.

2. The process according to claim 1, wherein an anionic group in the polyurethane to be neutralized is a carboxylic acid group.

3. The process according to claim 2, wherein the ratio of tertiary amine functions in the neutralizing agent to the carboxylic acid functions in the anionic polyurethane is from 0.5:1 to 1.5:1.

4. The process according to claim 3, wherein the ratio of tertiary amine functions in the neutralizing agent to the carboxylic acid functions in the anionic polyurethane is from 0.7:1 to 1.2:1.

5. The process according to claim 1, wherein the aqueous dispersion of an anionic polyurethane and/or tertiary amine functional urethane polymer or oligomer or dispersion thereof contains additional functional groups selected from polyalkoxy functions containing ethoxy functions, incorporated silicon functions, perfluor functions, ketone, aceto acetate or aldehyde functions, pendant hydrazide or hydrazone functions, or mixtures thereof.

6. The process according to claim 1, wherein the tertiary amine functional urethane oligomer or polymer is prepared by the reaction of a polyisocyanate or an isocyanate functional polyurethane prepolymer with a reactive hydrogen functional material which contains tertiary amine functions, which preparation comprises the steps of:
    preparing an isocyanate functional polyurethane prepolymer containing tertiary amine functions from a polyisocyanate and a polyol which contains tertiary amine functions; and
    chain extending and/or partially capping the tertiary amine functional prepolymer with a reactive hydrogen functional material.

7. The process according to claim 1, wherein the tertiary amine functional urethane oligomer or polymer is produced as an aqueous dispersion and is prepared by the reaction of a polyisocyanate or an isocyanate functional polyurethane prepolymer with a reactive hydrogen functional material which contains tertiary amine functions, which preparation comprises the steps of:
    preparing an isocyanate functional polyurethane prepolymer containing tertiary amine functions from a polyisocyanate and a polyol which contains tertiary amine functions;
    dispersing the prepolymer into water; and
    chain extending and/or partially capping the tertiary amine functional prepolymer with a reactive hydrogen functional material during or after the dispersion in water.

8. The process according to claim 6 or 7, wherein said polyol which contains tertiary amine functions which is used to prepare the tertiary amine functional polyurethane prepolymer is N-ethyidiethanolamine, N-butyldiethanol-amine, N-tert-butyldiethanolamine, 3-diisopropylamino-1,2-propanediol, 3-(dimethylamino)-1,2-propanediol, 3-(diethylamino)-1,2-propanediol, triethanolamine, tripropanolamine, triisopropanolamine, N-methyldiethanolamine, or (3-dimethylamino-propyl) diisopropanolamine.

9. The process according to claim 6 or 7, wherein said reactive hydrogen functional material is a tertiary amine functional polyol, polyamine, mono-amine, mono-alcohol or a mixture thereof.

10. The process according to claim 9, wherein the reactive hydrogen functional material is a polyol which contains tertiary amine functions and which is selected from the group consisting of N-ethyldiethanolamine, N butyldiethanol-amine, N-tert-butyldiethanolamine, 3-diisopropylamino-1,2-propanediol, 3-(dimethylamino)-1, 2-propanediol, 3 (diethylamino)-1,2-propanediol, triethanolamine, tripropanolamine, triisopropanolamine, N methyldiethanolamine, or (3-dimethylamino-propyl) diisopropanolamine, or is a diamine which contains a tertiary amine function.

11. The process according to claim 10, wherein the reactive hydrogen functional material is bis (3-aminopropyl) methylamine.

12. The process according to claim 9, wherein the mono-amine or mono-alcohol containing a tertiary amine is 2-(diethylamino)ethyl-amine, 3-(diethylamino)-propylamine, N,N,N'-trimethyl-ethylenediamine, N,N,N'-trimethyl-1,3-propanediamine, N,N,2,2-tetramethyl-1,3-propylenediamine, N,N-diethylethanolamine, 1-dimethylamino-2-propanol, 3-dimethylamino-1-propanol, 2-dimethylamino-2-methyl-1-propanol, 1-diethylamino-2-propanol, 3-diethylamino-1-propanol, 2-(diisoprophylamino)ethanol, 5-diethylamino-2-pentanol, 2-(dibutylamino)-ethanol, 2-(dimethylamino)ethylamine, N,N-dimethylethanolamine, or bis(3-dimethylamino) propylamine or mixtures thereof.

13. The process according to claim 6 or 7, wherein the polyisocyanate is 2,4-toluene-diisocyanate, 2,6-oluenediisocyanate or mixtures thereof, 1,6-hexanediisocyanate, dicyclohexyl-methane-4,4'-diisocyanate, 3-isocyanatomethyl-3,5,5-trimethylcyclohexylisocyanate, tetramethylxylene-diisocyanate, N,N',N"-tris(6-isocyanato-hexyl)isocyanurate, N,N'-bis(6-isocyanatohexyl)-N-(6-isocyanatohexylamido)urea, or mixtures thereof.

14. The process according to claim 6 or 7, wherein another polyol is present during the tertiary amine functional prepolymer formation, which is selected from a polyethoxy diol, a poly(ethoxy/propoxy) diol, a diol containing a pendant ethoxy or (ethoxy/propoxy) chain, a diol containing a carboxylic acid or a sulphonic acid or salt, or mixtures thereof.

15. The process according to claim 6 or 7 wherein the reactive hydrogen functional material for the chain extension of the tertiary amino functional polyurethane prepolymer is a diamine selected from 1,2-diamino-propane, 1,3-diaminopropane, hydrazine, 5-amino-1,3,3-trimethylcyclohexanemethyl-amine, methylpentanediamine, hexanediamine, butyldiamine, poly (ethoxy/propoxy)diamine, polyethoxydiamine, polypropoxydiamine, bis(3-aminopropyl)methylamine or a N-hydrazone functional 5-amino-1,3,3-trimethylcyclohexane-methylamine, or mixtures thereof.

16. A dispersion obtained by the process of claim 1.

17. The dispersion according to claim 16, comprising additives taken from the group consisting of coloring agents, pigments, matting agents, silicones, and flow agents.

18. A coated substrate or film, which is obtained by applying a dispersion of claim 16 or 17 onto a substrate taken from the group consisting of leather, artificial leather, metal, wood, glass, plastic, paper, paper board, textiles, non-woven fabrics, cloth, and foam.

* * * * *